May 14, 1929.  W. BOEHM  1,713,367
SPARE TIRE COMPARTMENT
Filed Oct. 3, 1927
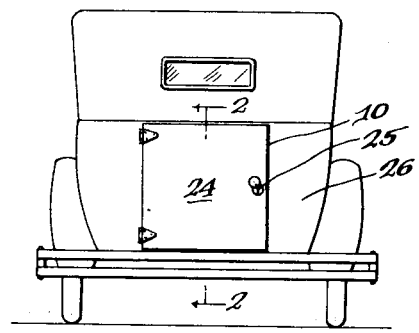
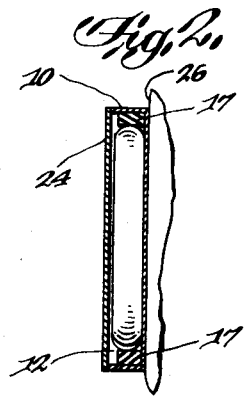
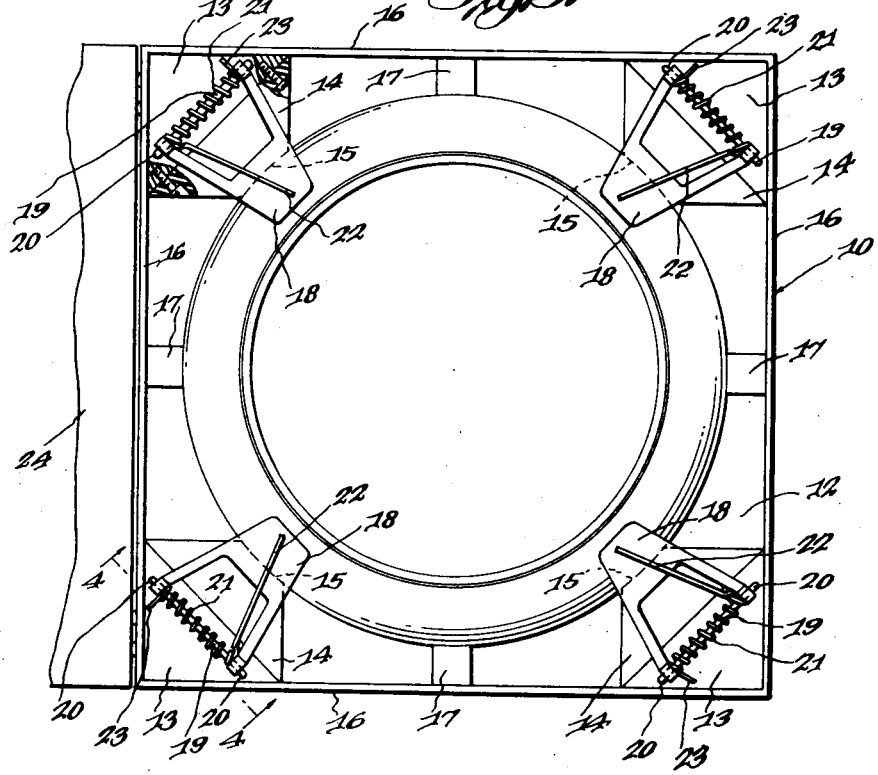
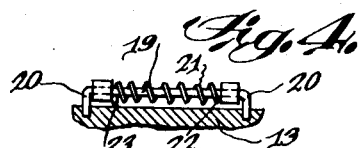
William Boehm
INVENTOR
BY Victor J. Evans
ATTORNEY
WITNESS: Adolph Radosta Patented May 14, 1929.

1,713,367

UNITED STATES PATENT OFFICE.

WILLIAM BOEHM, OF CICERO, ILLINOIS.

SPARE-TIRE COMPARTMENT.

Application filed October 3, 1927. Serial No. 223,681.

This invention relates to certain novel improvements in spare tire compartments and has for its principal object the provision of an improved construction of this character which will be highly efficient in use and economical in manufacture.

Among the several objects of the invention is to provide a tire compartment into and from which a spare tire may be expeditiously taken out and mounted in and which will prevent the tire from vibration and protect the same from the elements of the weather.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a rear view of an automobile showing my invention associated therewith;

Fig. 2 is a sectional detailed view taken substantially on line 2—2 of Fig. 1;

Fig. 3 is an elevational view of the invention showing the interior thereof; and Fig. 4 is a sectional detailed view taken substantially on line 4—4 of Fig. 3.

Referring more particularly to the drawing the tire compartment includes a box-like body 10 within which the spare tire is adapted to be mounted. The compartment 12 provided by this body is of sufficient size to receive a standard sized tire. At each corner of the body there is mounted, within the compartment a block 13 and secured to this block 13 is a cushion block 14 having its outer edge 15 curved to conform to the curvature of the tire. The walls 16 of the body, intermediate their end portions carry cushion blocks 17 which project into the compartment for engagement with the tire.

Fastening means is provided for holding the tire in the compartment and in the present instance this fastening means includes plates 18 pivotally supported by pins 19 having their end portions 20 fixed in any approved manner into the blocks 13. Carried by the pins are springs 21. These springs have their end portions 22 bearing against the plates and their opposite end portions 23 bearing against the blocks 13 whereby when the plates are pivoted outwardly the springs will be brought under tension whereby to yieldably urge the plates into tire holding position. The body is provided with a mounted cover 24 and there is associated with the cover a suitable lock 25. The body is adapted to be positioned against the back 26 of the automobile above the fender or trunk as the case may be and secured thereto in any approved manner.

The rubber cushion blocks prevent rattling of the tire when the automobile is in motion and the plates 18 hold the tire within the compartment when the tire is in closed position and also prevent the tire from rubbing or knocking against the door when the door is closed.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claim.

Having thus described my invention, what I claim as new and desire to protect by Letters Patent is:

In a device of the class described, a body providing a compartment having an open side, cushioning blocks disposed at the corners of the said compartment, other cushioning blocks positioned intermediate said first named cushioning-blocks on the walls of said body, said cushioning blocks having inwardly disposed surfaces thereof formed to receive a tire of a predetermined size, and means for retaining said tire in said cushioning blocks including plate members, ears formed on said cushioning blocks, means for pivotally connecting said plate members to said ears, and spring means adapted to bear on said plate members whereby to urge said plate members into retaining position.

In testimony whereof I affix my signature.

WILLIAM BOEHM.